UNITED STATES PATENT OFFICE.

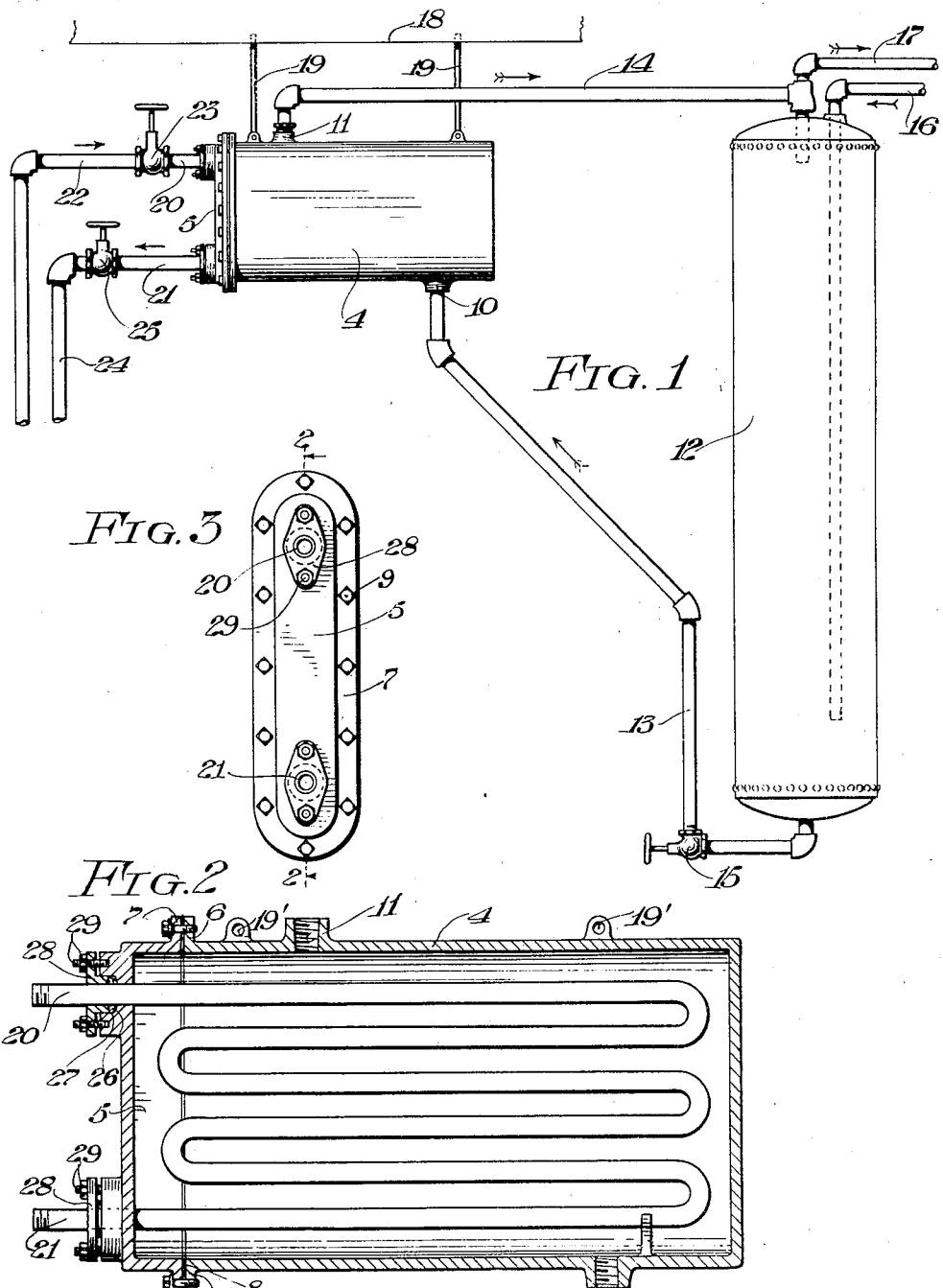

ALBERT H. DUMMER, OF MANITOWOC, WISCONSIN.

GRAVITY WATER-HEATER.

1,333,841.  Specification of Letters Patent.  Patented Mar. 16, 1920.

Application filed June 11, 1919. Serial No. 303,339.

*To all whom it may concern:*

Be it known that I, ALBERT H. DUMMER, a citizen of the United States, and resident of Manitowoc, in the county of Manitowoc and State of Wisconsin, have invented new and useful Improvements in Gravity Water-Heaters, of which the following is a description, reference being had to the accompanying drawings, which are a part of this specification.

The invention relates to a gravity water heater used to supply hot water for residences, stores and other buildings, and is adapted to be connected to a tank or range boiler wherein the hot water is stored at low pressure.

The principal object of the invention is to provide a water heater, to be heated by steam from a steam boiler or a steam heating unit, consisting of few parts so constructed and arranged as to be capable of being readily cleaned and repaired.

A further object of the invention is to provide simple connections between the heater shell and the steam coil to allow for contraction and expansion thereof.

Further objects of this invention are to provide a heater of this type which may be readily turned on and off as desired, which will occupy small space and will be economical in the use of steam.

The invention further consists in the several features hereinafter set forth and more particularly defined by claims at the conclusion hereof.

In the drawings: Figure 1 is a view of the device embodying the invention, connected up with a steam supply system and with the hot water tank; Fig. 2 is a vertical sectional view of the heater taken on the line 2—2 of Fig. 3; Fig. 3 is an end view of the heater.

The heater consists of a closed tank 4 provided with a removable cover 5. The shape of this tank is preferably in the form of a long, thin, rectangular prism, that is, the length and height of the tank are much greater than its width. The body of the tank is provided with a flanged end 6 which registers with a corresponding flanged end 7 of the removable cover 5, a suitable gasket 8 being interposed between said flanged portions, and the cover is clamped into place by means of bolts 9. The tank has an inlet 10 for the cold water and an outlet 11 for the hot water. Water is circulated through the tank from a hot water tank 12 by means of piping 13 connecting the lower end of the hot water tank with the inlet 10 of the heater and by piping 14 connecting the outlet 11 of the heater with the upper end of the hot water tank. The rate of flow of the water from the hot water tank to the heater may be controlled by a valve 15. Cold water is fed to the hot water tank through a pipe 16 which extends down to a position near the bottom of the tank and hot water is drawn off from the hot water tank and also direct from the heater by a pipe 17 which communicates with the pipe line 14 leading into the hot water tank. The heater pipe 14, tank 12 and piping 13 thus form a circulating system for the hot water by which the cold water introduced into the tank 12 is thence passed to the heater, heated and then returned to the top of the hot water tank. The heater is preferably secured to the ceiling 18 of the building by suitable hangers 19 secured to lugs 19' and in this position occupies little space.

The means for heating the water in the heater consists of a flat steam coil having several bends, with an inlet end 20 and an oulet end 21. The inlet end 20 connects with the steam supply pipe 22 from a suitable steam generator, passage of steam to the coil being controlled by a valve 23, and the outlet 21 connects with the return pipe 24 having a control valve 25 therein. By means of these valves the heater may be readily shut off or turned on at any time and the amount of steam used regulated.

As will be seen from Fig. 3 of the drawings, the coil is centrally located with respect to the front and back sides of the tank and due to the short distance between these sides and the coil a very efficient circulation and heating of the water is obtained. It will also be observed from Fig. 2 that the coil is spaced but a short distance from the ends and top and bottom of the tank which also aids in efficient circulation and heating of the water. In brief, the disposition of the coil in the tank in close proximity to the walls thereof, causes the heat from the coil to be quickly and efficiently imparted to the water.

The ends of the steam coil pass through the cover 5 and in each instance there is packing 26 seated in the end of a bore 27 and a packing gland 28 secured to the cover by means of stud bolts 29. These connections between the coil and the cover allow for contraction and expansion of the steam coil.

When the steam is turned on and allowed to circulate through the coil, the water then in the heater will be quickly heated and circulation of the water will then start between the hot water tank and the heater and as the hot water is drawn off from the pipe 17, cold water is introduced through the pipe 16 into the hot water tank and is heated during its circulation through the heater.

With the above construction, should the heater become clogged by a deposit of lime or other foreign matter, or should the steam coil need to be inspected, it is a simple matter to disconnect the cover from the body of the tank and remove the coil so as to gain access to the interior of the heater or to inspect the coil.

What I claim as new and desire to secure by Letters Patent is:

1. In a hot water heater, the combination of a tank of relatively less width than its length and height and having flat sides, a removable cover, an inlet and an outlet, a flat steam coil with the coils thereof disposed within the tank and its ends passing through the cover, and a joint between said cover and the ends of the coil to permit expansion and contraction of said coil.

2. In a hot water heater, the combination of a relatively narrow rectangular tank provided with a cover, an inlet and an outlet, and a steam coil disposed within the tank in close proximity to the walls thereof.

3. In a hot water heater, the combination of a rectangular tank with its length and height much greater than its width, a steam coil disposed within the tank and spaced a short distance from the front and back sides of the tank, said tank having an inlet and an outlet.

In testimony whereof I affix my signature in presence of two witnesses.

ALBERT H. DUMMER.

Witnesses:
  WENZEL C. KADOW,
  IRMA SCHMITZ.